United States Patent [19]

Miller

[11] Patent Number: 4,722,950

[45] Date of Patent: Feb. 2, 1988

[54] FRICTION MATERIAL

[75] Inventor: Michael E. Miller, Saratoga Springs, N.Y.

[73] Assignee: Allied Corporation, Morristown, N.J.

[21] Appl. No.: 882,645

[22] Filed: Jul. 7, 1986

[51] Int. Cl.$^4$ .............................................. C08K 3/08
[52] U.S. Cl. .................................. 523/156; 523/152; 523/153; 523/155
[58] Field of Search ............... 523/155, 156, 152, 153, 523/157, 158

[56] References Cited

U.S. PATENT DOCUMENTS

| | | | |
|---|---|---|---|
| 4,119,591 | 10/1978 | Aldrich | 523/156 |
| 4,278,584 | 7/1981 | Noguchi et al. | 523/155 |
| 4,310,452 | 1/1982 | Chester | 523/156 |
| 4,316,827 | 2/1982 | Pecala et al. | 523/158 |
| 4,386,168 | 5/1983 | Fujimaki et al. | 523/155 |
| 4,593,070 | 6/1986 | Oyama et al. | 523/158 |
| 4,617,165 | 10/1986 | Tsang et al. | 523/158 |

FOREIGN PATENT DOCUMENTS

| | | | |
|---|---|---|---|
| 56-131847 | 12/1981 | Japan | 523/155 |
| 59-133841 | 8/1984 | Japan | 523/155 |
| 2047722 | 12/1980 | United Kingdom | 523/155 |

*Primary Examiner*—Lewis T. Jacobs
*Attorney, Agent, or Firm*—Leo H. McCormick, Jr.; Ken C. Decker

[57] ABSTRACT

A composition of material for use as a friction material for a brake lining wherein steel fiber is the only metallic ingredient and the holding matrix is formed by rubber particles and phenolic resin. The holding matrix being strengthened by a reaction of the resin with calcium hydroxide. When the steel fiber comprises from 25–48% by weight of the total mixture and the rubber particles and phenolic resin comprise 17–25% by weigh of the total mixture, a sufficient structural unity is produced for the resulting friction material to withstand dynamic loading experienced during a brake application.

4 Claims, 10 Drawing Figures

| MATERIAL | | X | A | B | C | D | E | F | G | H | I | J | K | L |
|---|---|---|---|---|---|---|---|---|---|---|---|---|---|---|
| ASBESTOS FIBER | | 68 | 40 | 40 | 42 | 43 | 45 | 42 | 45 | 45 | 48 | 43 | 43 | 25 |
| STEEL FIBER | | | 6 | 6 | 6 | 7 | 6 | 6 | 13 | 13 | 15 | 16 | 22 | 8 |
| *CARBONACEOUS | | | 10 | 12 | 7 | 4 | | 5 | 9 | 9 | | 9 | 7 | 2 |
| **FRICTION MODIFIERS | | 9 | | | | | 25 | 23 | 11 | 11 | 14 | 10 | 8 | 33 |
| ***FILLERS | | | 22 | 16 | 23 | 24 | 10 | 10 | 10 | 10 | 10 | 13 | 9 | 13 |
| BINDER | RUBBER | 3 | 9 | 9 | 9 | 9 | 12 | 12 | 8 | 8 | 9 | 9 | 8 | 10 |
| | RESIN DRY | 20 | 8 | 10 | 8 | 8 | | | | | | | 3 | |
| | RESIN LIQUID | | 3 | | 3 | 3 | | | 4 | 4 | 4 | | | |
| ****CURING AGENTS | | | 2 | 7 | 2 | 2 | 2 | 2 | | | | 6 | | 9 |

*CARBON, GRAPHITE, COKE
**SILICA, MAGNESIUM, OXIDE
***WHITING, BARYTES
****CURING AGENTS
 RUBBER = SULFUR
 RESIN = CALCIUM HYDROXIDE

FIG. 1

FRICTION MATERIAL

BACKGROUND OF THE INVENTION

This invention relates to a composition of material for use as a friction material in a brake. This composition uses steel fiber as the reinforcing material. The steel fiber is combined with fillers, a lubricant, and friction modifiers which are held in a binder made up of rubber and phenolic resin. The resulting friction material has a substantially uniform and predictable coefficient of friction after repeated brake applications.

Many different fibers have been suggested as a substitute for asbestos in reinforcing a brake lining, for instance U.S. Pat. No. 3,967,037 discloses the use of glass fiber, U.S. Pat. No. 3,896,075 discloses the use of basalt fiber, U.S. Pat. No. 4,019,912 discloses the use of carbon fiber, and U.S. Pat. No. 4,119,591 discloses the use of a mixture of cellulose and steel fibers. Unfortunately such substitutions have resulted in some undesirable characteristics such as rotor wear, low temperature coefficient of friction stability, noise and high temperature structural unity.

SUMMARY OF THE INVENTION

The composition of matter for the friction material of this invention is reinforced by steel fibers having a length of 3-15 mm. The steel fibers make up from 25-48% by weight of the total composition. The steel fibers, lubricant, fillers and friction modifiers are held together by a binder made up of approximately equal amounts of rubber and phenolic resin. The binder comprises from 17-25% by weight of the total composition. The phenolic resin is modified by a reaction with calcium hydroxide during curing to stiffen the binder and with the steel fiber develops sufficient strength in a resulting friction material to withstand dynamic loading experienced during a brake application.

In performance test, the friction material exhibited a move stable coefficient of friction during repeated brake applications than a reference friction material that included asbestos fibers.

This composition of material when used as a friction lining provides an advantage over friction linings that have asbestos therein since the coefficient of friction is substantially stable over the operating range of a brake.

It is an object of this invention to provide reinforcement for a brake lining through the use of steel fiber held in a binder matrix stiffened by a reaction of calcium hydroxide and phenolic resin. The strength of the binder is enhanced by curing rubber in the composition by sulfur such that the total strength is sufficient to withstand dynamic loads experienced during a brake application.

These objects and advantages should be apparent from reading this specification in conjunction with the drawings.

FIG. 1 is a table setting forth examples in ingredients in the composition of material disclosed in this application;

DETAILED DESCRIPTION OF THE INVENTION

In order to evaluate the composition ot matter developed by this invention, a typical composition of matter having asbestos reinforcement which meets the current stopping requirements of customers was selected as a base line composition, this base line is disclosed in FIG. 1 as composition X. The ingredients in composition X were placed in a mixer and after uniformly dispursing the ingredients throughout, a portion of the mixture was placed in a mold to produce a brake lining. Thereafter, the brake lining was placed in an oven and resin therein cured to establish a matrix for holding the ingredients in a fixed relationship.

The asbestos fiber in composition X was removed and replaced with steel fiber having a nominal length of between 3-15 mm to produce composition A. As shown in FIG. 1, composition A also includes carbonaceous materials, friction modifiers, fillers and a binder system. The binder system includes both rubber and phenolic resin. The rubber was cured by the addition of sulfur at about 20% by weight of rubber and the resin was modified by the addition of calcium hydroxide. After the mixture was uniformly mixed, a portion was removed and placed in a mold to produce a brake lining. The curing of the resin as modified by the calcium hydroxide makes the resin matrix stiffer and as a result the physical strength of the brake pad is increased. The inclusion of silica and magnesium oxide enhances the coefficient of friction while whiting adds to the friction stability. In order to provide for minimum wear between the brake pad and a corresponding mating surface, graphite carbon coke or a combination thereof provides for some lubrication.

The brake pads in compositions X & A were molded into a shape corresponding to the rear brake used on the Topaz vehicle manufactured by Ford Motor Company. This brake has a drum diameter of 8" and a weight of 576# of the vehicle assigned thereto. In order to determine the effectiveness of the brake linings made from compositions A & X the torque required to decelerate a vehicle at 6.4, 19.2 and 32.0 ft./sec.$^2$ was calculated. In this analysis, torque is defined as a ratio of the average torque to line pressure times the area of the wheel cylinder. Thus, a higher value of torque indicates a more effective lining material. Differences in torque from stop to stop reveal changes in friction lining, such that, as a lining fades, the torque decreases. A total of 108 stops were made to simulate pre-burnish, post burnish and final effectiveness of the lining at an initial brake temperature of 0°, 100° and 200° F. for a vehicular speed of 30 and 60 mph.

Figure 4:
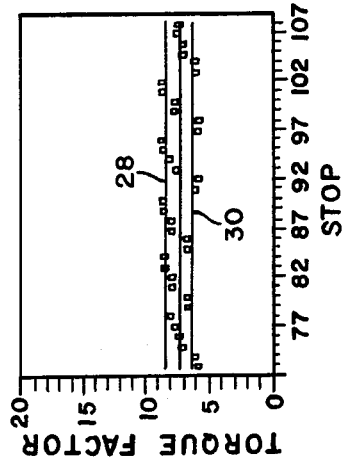
FIG. 4 is a graph showing the final effectiveness of a base line material.
Figure 3:
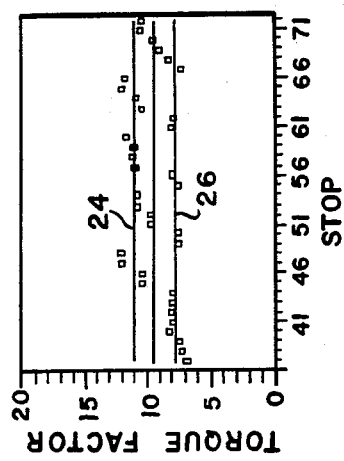
FIG. 3 is a graph showing the post-burnish effectiveness of a base line material.
Figure 2:
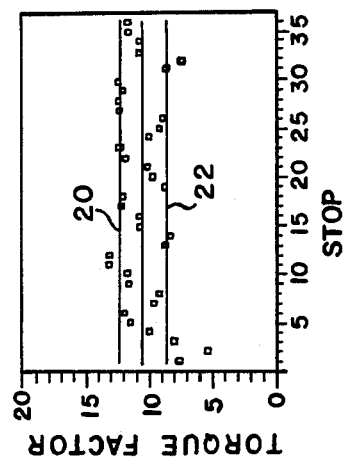
FIG. 2 is a graph showing the pre-burnish effectiveness of a base line material.

FIG. 2 illustrates the torque factor calculated to stop a vehicle under pre-burnished conditions, FIG. 3 illustrates the torque factor calculated to stop a vehicle under post-burnish conditions, and FIG. 4 illustrates the torque factor calculated to stop a vehicle under final effectiveness conditions for composition X. From the total 108 stops, it was determined that composition X had an average torque factor of 9.103, a minimum torque factor of 5.422 and a maximum torque factor of 13.262. The minimum and maximum torque factors can be used in calculating the best and worst case condition for a brake. On any given day, on any given test, with any given brake lining there is a chance that the effectiveness will fall outside a range defined by a standard deviation. Statistically for a torque factor range of from 5.422 to 13.262, it can be shown that a standard deviation is 1.966. An important ramification of the standard deviation is that the smaller it is, the greater the friction stability of the brake lining under test. An ideal brake system would have all its components operating such that the system would operate smoothly without lockup with the torque factor of the rear lining having values at a range defined by the average torque factor $+/-$ a standard deviation.

Since the test for composition X was separated into pre-burnish, post-burnish and final effectiveness, a statistical analysis for each segment was performed.

For the pre-burnish segment the overage torque factor was calculated to be 10.485 with a minimum of 5.422 and a maximum of 13.262. The standard deviation was found to be 1.818 which results in a range indicated by lines 20 and 22 in FIG. 2.

For the post-burnish segment, the average torque factor was calculated to be 9.381 with a minimum of 6.752 and a maximum of 11.919. The standard deviation was found to be 1.613 which results in a range indicated by lines 24 and 26 in FIG. 3.

For the final effectiveness segment, the average torque factor was calculated to be 7.444 with a minimum of 5.816 and a maximum of 8.844. The standard deviation was found to be 0.976 which resulted in a range indicated by lines 28 and 30 in FIG. 4.

When the averaqe torque for the entire test for composition X is compared with the average torque for the segments, it is apparent that the effectiveness of the lining diminished as the test progressed from pre-burnish through final effectiveness for composition X. The standard deviation of the torque factor decreased as the test progressed for composition X. This decrease indicated that composition X had a decreasing sensitivity for initial brake temperature and line pressure.

Figure 7:
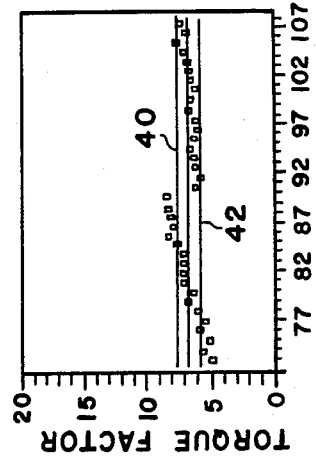
FIG. 7 is a graph showing the final effectiveness of a composition made according to this invention.
Figure 6:
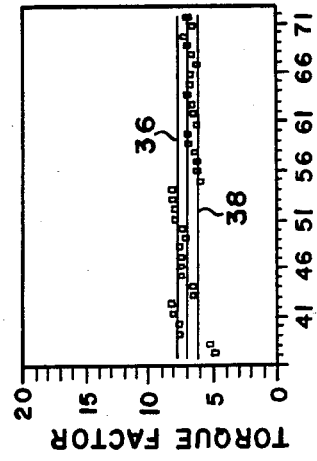
FIG. 6 is a graph showing the post-burnish effectiveness of a composition made according to this invention.
Figure 5:
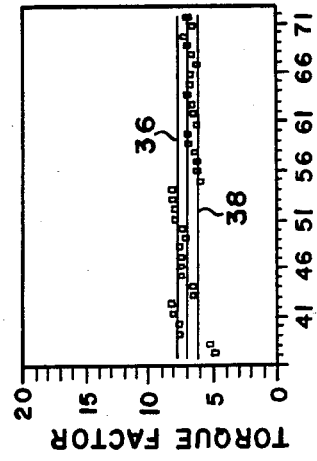
FIG. 5 is a graph showing the pre-burnish effectiveness of a composition made according to this invention.

The friction lining made from composition A was tested in the same manner as composition X to produce the 108 stops: 36 stops for pre-burnish illustrated in FIG. 5; 36 stops for post-burnish illustrated in FIG. 6; 36 stops and for final effectiveness illustrated in FIG. 7. The average torque factor for the 108 stop was calculated to be 6.819 with a minimum of 4.695 and a maximum of 8.457. The standard devialion was found to be 0.857.

In the individual segments of the test, the average torque for pre-burnish was calculated to be 6.712 with a minimum of 4.797 and a maximum of 7.956. The standard deviation was found to be 0.868 which resulted in a range illustrated by lines 32 and 34 in FIG. 5.

For post-burnish the average torque was calculated to be 6.984 with a minimum of 4.695 and a maximum of 8.244. The standard deviation was found to be 0.888 which resulted in a range shown by lines 36 and 38 in FIG. 6. For final effectiveness, the average torque factor was calculated to be 6.761 with a minimum of 4.821 and a maximum of 8.457. The standard deviation was found to be 0.877 which resulted in a range shown by lines 40 and and 42 in FIG. 7.

When the average torque factor for the entire test is compared with the torque factor for the individual segments, it was found that they were within 5% of the average. This indicates that the friction lining of composition A has substantially the same effectiveness throughout the entire test. This is also reflected in the calculation of the standard deviation which is relatively constant.

Figure 8:
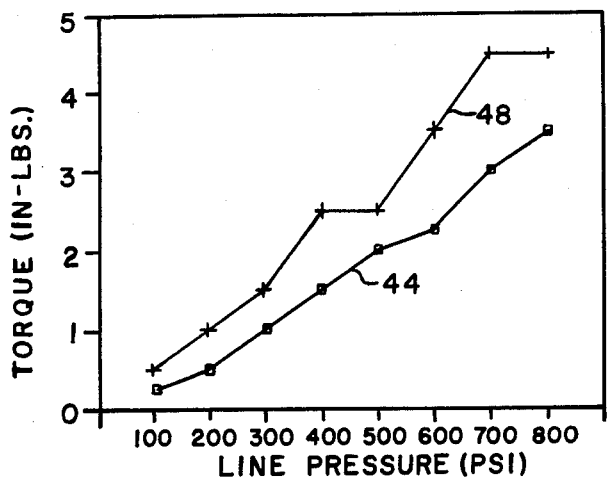
FIG. 8 is a graph showing static friction of the base line material.
Figure 10:
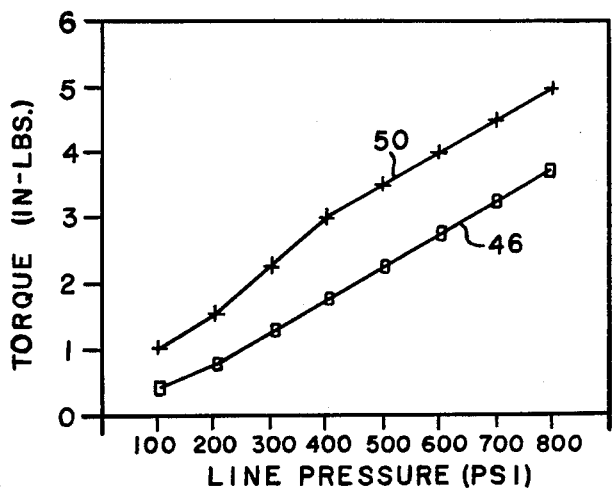
FIG. 10 is a graph shown static friction of a composition of material made according to the invention.

Since parking brakes for most vehicles are only connected to the rear wheels, a static friction analysis of compositions X and A was performed. In this analysis the minimum holding torque for a vehicle on a grade is measured. In FIG. 8, curves 44 and 48 illustrate the holding torque for composition X. Curve 44 represents forward motion and curve 48 represents reverse motion on a slope. Curves 46 and 50 in FIG. 10 represent the static friction produced by composition A. From a review of FIG. 10, composition A produced more static friction and thus be capable of holding a vehicle on a steeper incline under the same condition.

Figure 9:
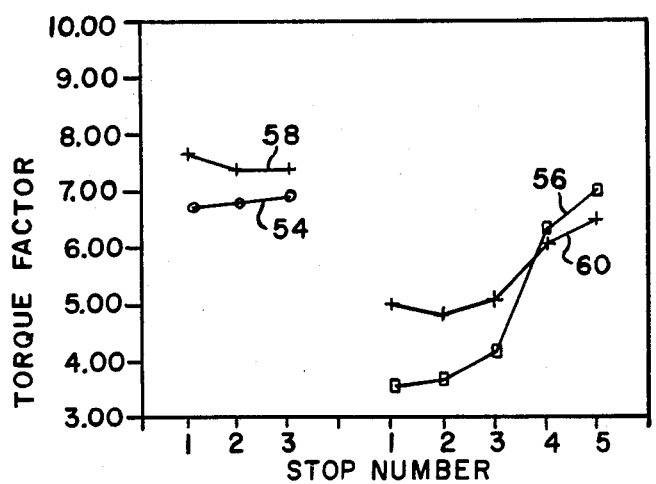
FIG. 9 is a graph comparing water recovery of the base line and a composition of material made according to this invention.

Since vehicles often operate under conditions where the brake linings are wet, as for example after a vehicle has passed through a puddle of water. For this reason a water recovery analysis was performed on compositions X & A. In performing this analysis, several stops are made to establish a base line and then the brake lining submerged in water. Thereafter, the test is resumed. When the torque factor is equal to the baseline, a water recovery is considered completed. Curves 54 and 56 in FIG. 9 illustrate the baseline and recovery for composition X and curves 58 and 60 represent the baseline and recovery for composition A. Composition X recovered to the baseline torque factor at the fourth stop while it is projected that composition A would recover after about 7 stops.

From a customer standpoint, wear of a brake lining is one of the most important factors in selecting one lining over another lining. Before the test began, the thickness of the brake lining of composition X was measured at 7 different points on the brake lining for both the primary and secondary shoe. The average wear for composition X on the primary shoe was 0.002371 inches and on the secondary shoe was 0.000858 inches. The average wear for composition A on the primary shoe was 0.001479 inches and on the secondary shoe was 0.000729 inches.

Visual inspection of composition X after the 108 stops revealed a smooth surface glaze with some cracking adjacent one rivet hole while the corresponding drum was dull and showed some scoring.

Visual inspection of composition A after 108 stops revealed a polished surface, which was dusty and faintly scored while the corresponding drum was polished with water spots, some scoring and light dust.

From the above test, it was evident that composition A was an acceptable substitute for composition X.

To further evaluate composition A, a series of compositions B-L shown in FIG. 1 were compounded and placed on a vehicle. The material compositions B-L were evaluated for noise generated during braking since this is a primary consideration of an acceptable production lining after friction stability and wear. Compositions B-L were based on composition A with materials added and substracted in an effort to attenuate noise.

Composition B differs from composition A in that the liquid resin was eliminated and the dry resin increased, the filler (Whiting) was reduced, the friction modifier (silica) increased and the calcium hydroxide increased. The calcium hydroxide reacts with the phenolic resin to provide physical strength for the resulting brake lining. During this test no unacceptable noise was produced. The low noise level of composition B is attributed to the high level of calcium hydroxide in this formula.

Composition C differs from composition A in that the silica was removed and the other ingredients proportionally increased. This material when tested did not produce unacceptable noise all through the friction level or efficiency seemed to be decreased as a result of the total removal of the silica.

Composition D is similar to composition C in that rather than remove the silica, the magnesium oxide was removed from composition A and the remaining ingredients proportionally increased. Composition D when tested did produce noise and as a conclusion, it is presumed that the silica in composition D may be responsible for noise.

In composition E, the silica and magnesium oxide were removed from composition A and the remaining ingredients proportionally increased. When tested on a vehicle composition E failed due to cracking prior to completion of the noise evaluation. However, prior to termination of this test, a reduction in noise levels was observed.

In composition F, the silica and magnesium oxide of composition A was reduced by one half and the other ingredients proportionally increased. Composition F was installed on a vehicle and was acceptable since no objectional noise was observed during the major portion of the noise test.

In composition G, the silica and calcium hydroxide were removed, graphite was doubled and the other ingredients proportionally increased. When placed on a vehicle, the noise level of composition G was unacceptable.

In composition H, the silica and magnesium oxide were reduced, the graphite increased and the calcium hydroxide eliminated. When composition H was placed on a vehicle, hill noise was observed throughout the test.

In composition I the silica, magnesium oxide and calcium hydroxide were removed, and the remaining ingredients proportionally increased. When composition I was placed on a vehicle, this test was terminated due to high temperature inbalance between the primary and secondary shoes.

In composition J the filler whiting was reduced, while the graphite and calcium hydroxide and steel fiber content were increased. When composition J was tested on a vehicle, very little noise was observed. It is believed that the high calcium hydroxide content in composition J which reacts with the resin therein to provide a stiffer structure is a primary factor in reducing noise.

In order to evaluate the effect of fillers on the composition A, the carbonaceous ingredients were increased by the addition of coke and carbon, the calcium hydroxide removed, and the remaining ingredients proportionally increased to produce composition K. When a brake lining of composition K was placed on a vehicle, the brake lining exhibited good friction stability and very little noise with the exception of one brake application on a hill.

To set a range for the steel fiber, fillers and calcium hydroxide, these ingredients were selected to fall within what could reasonably be expected the limits for such ingredients in a brake lining to produce composition L. Composition L was placed on a vehicle and possessed sufficient strength to complete the noise test. Noise was within an acceptable level, however, corresponding drum was polished but not scored. Unfortunately, it was felt that wear for composition L may be unacceptable.

In conclusion, it is my opinion from the test performed on the composition A and the various modifications thereof wherein the binder therein makes up from 46-60% by volume which comprises from 17-25% by weight of the total mix a good strength can be achieved. The binder can be a mixture of liquid resin, dry resin and a chemical resistant rubber wherein the rubber makes up at least 50% of the total binder. The rubber being cured by the addition of sulfur at about 20% by weight of the rubber in the mixture and the resin being modified by a reaction with calcium hydroxide to improve the physical strength of a resulting brake pad. The primary reinforcement strength of the brake pad being provided by steel fibers, having a length of 3-15 mm. The steel fiber which makes up from 7-10% by volume comprises from 40-48% by weight of the total mixture. In order to prevent excessive wear at high temperature, it is suggested that a lubricant such as petroleum coke, graphite, carbon or a combination thereof be added to the basic mixture. While the percentage of lubricant can vary from 7-30% by volume, it is preferred that the lubricant be limited to from 6-8% by weight of the total mixture. The remaining ingredients in composition A, which are fillers and friction modifiers, whiting, barytes, talc, etc., can be adjusted to change the friction level, however, the friction stability and overall effectiveness appears to be optomized when the fillers are at about 20% by volume or weight of the total composition and the friction modifiers, silica and magnesium oxide, are held to about 5% by volume or 10% by weight of the total composition.

Thus, the evaluation of composition A with the asbestos based composition X should provide a customer with evidence that composition A would perform in an acceptable manner as a substitute for asbestos based friction lining.

What I claim is:

1. In a friction material having a mixture of ingredients including organic ingredients, inorganic ingredients, friction modifiers and a reinforcing fiber held in a binder, the improvement consisting of:

the reinforcing fiber comprising at least 25% by weight of the total friction material, said reinforcing fiber being steel fiber and having a nominal length of between 3-15 mm to provide structural unity for the friction material;

the binder comprising at least 17% by weight of the total friction material, said binder consisting of a mixture of liquid resin, dry resin and rubber wherein said rubber makes up at least 50% by weight of said binder; and curing agents consisting of sulfur and calcium hydroxide, said sulfur consisting of at least 20% by weight of said rubber and said calcium hydroxide consisting of from 2-10% by weight of the total mixture, said sulfur reacting with said rubber and said calcium hydroxide reacting with the liquid and dry resin to enhance the strength of the binder to withstand dynamic loads experienced by the friction material during a brake application.

2. In the friction material as recited in claim 1 wherein the friction modifiers consist of:
magnesium oxide and silica comprising from 2 to 10% by weight of the total friction mixture to establish a stable coefficient of friction over an operating range normally experienced by the friction material.

3. In the friction material as recited in claim 3 wherein the average coefficient of friction is substantially predictable after repeated engagements of the friction material with another material.

4. A composition of material for use as a friction material consisting of:
25-48% by weight of steel fiber;
8-12% by weight of rubber;
2-16% by weight of a carbonaceous material;
6-22% by weight of whiting or barium sulfate;
2-10% by weight of magnesium oxide or silica;
2-10% by weight of calcium hydroxide;
9-13% by weight of phenolic resin;
up to 15% by weight of said phenolic resin being hexa to help to cure said phenolic resin; and
up to 30% by weight of said rubber being sulfur and curatives for said rubber; said calcium hydroxide reacting with the phenolic binder to improve the strength of a resulting matrix produced when the rubber and resin are cured to hold the steel fiber, carbonaceous material, whiting or barium sulfate, and magnesium oxide or silica in a fixed relationship, said steel fiber providing the structural unity for said friction material such that the resulting coefficient of friction is stabilized over the operating range of the friction material.

* * * * *

UNITED STATES PATENT AND TRADEMARK OFFICE
CERTIFICATE OF CORRECTION

PATENT NO. : 4,722,950

DATED : February 2, 1988

INVENTOR(S) : Michael E. Miller

It is certified that error appears in the above—identified patent and that said Letters Patent is hereby corrected as shown below:

Column 7, line 10, "3" should read --2--.

Signed and Sealed this

Twenty-first Day of May, 1991

Attest:

HARRY F. MANBECK, JR.

Attesting Officer

Commissioner of Patents and Trademarks